United States Patent [19]

Takahashi et al.

[11] Patent Number: 5,131,159

[45] Date of Patent: Jul. 21, 1992

[54] SPHEROMETER

[75] Inventors: Mitsuaki Takahashi; Masaki Watanabe; Fumiaki Munakata, all of Hachiooji, Japan

[73] Assignee: Olympus Optical Company Limited, Japan

[21] Appl. No.: 559,840

[22] Filed: Jul. 30, 1990

[30] Foreign Application Priority Data

Jul. 28, 1989 [JP] Japan .................. 1-197078

[51] Int. Cl.$^5$ ................................ G01B 5/22
[52] U.S. Cl. ......................... 33/507; 33/551; 33/568; 33/570; 33/833
[58] Field of Search ............... 33/549, 550, 551, 573, 33/507, 568, 570, 712, 832, 833, 200; 356/127

[56] References Cited

U.S. PATENT DOCUMENTS

| 1,921,508 | 8/1933 | Dawson | 33/549 |
|---|---|---|---|
| 2,807,982 | 10/1957 | McLeod | 356/127 |
| 3,848,339 | 11/1974 | Strasbaugh | 33/507 |
| 3,861,048 | 1/1975 | Thompson | 33/507 |
| 4,205,452 | 6/1980 | Wichterle et al. | 33/507 |
| 4,330,203 | 5/1982 | Oppenheim et al. | 356/127 |
| 4,403,420 | 9/1983 | Rarick | 33/507 |
| 4,674,190 | 6/1987 | Tusinski et al. | 33/507 |
| 4,676,004 | 6/1987 | Nakamura et al. | 33/200 |

FOREIGN PATENT DOCUMENTS 0076902  6/1980  Japan .................. 33/507

Primary Examiner—William A. Cuchlinski, Jr.
Assistant Examiner—Alvin Wirthlin
Attorney, Agent, or Firm—Bruce L. Adams; Van C. Wilks

[57] ABSTRACT

A spherometer for measuring the radius of curvature of 1 lens is disclosed. The spherometer comprises a spherometer ring having an annular portion or a part of an annular portion, a measuring member coaxially secured to the spherometer ring, a supporting member for supporting the spherometer ring, and a tilt facilitating member interposed between the spherometer ring and the ring supporting member.

9 Claims, 4 Drawing Sheets

SPHEROMETER

BACKGROUND OF THE INVENTION

The present invention relates to a spherometer for measuring the radius of curvature of a lens by comparing it with that of a reference lens.

A method of measuring the radius of curvature of the rough ground surface of the lens, generally utilizes a ring spherometer.

Such a spherometer is well known, for example, from "Grinding . Polishing" in "Optical Production Technology" 1984 (Japan Optical and Precision Instruments Manufacturer's Association).

FIG. 8 shows an outline of the spherometer. As shown in FIG. 8, a spherometer 101 has a spherical surface measuring section which comprises a dial gauge (display section) 102 and a spherometer ring 104 fitted onto a shaft 103 of the dial gauge 102 and secured by a screw 105. The shaft 103 is provided slidably with a measuring member (rod) 106 which in connected to the dial gauge 102.

The spherometer 101 serves to measure the radius of curvature of the lens by comparing it with the reference lens 107. In this case, the whole periphery of the spherometer ring 104 is placed in contact with the spherical surface and the dial gauge 102 is set at zerovalue. The whole periphery of the spherometer ring 104 is placed in contact with the spherical surface of the lens to be measured 108, thereby measuring the radius of curvature by a numerical value, corresponding to the displacement in the axial direction of the measuring rod 104, which numerical value is shown by the dial gauge 102.

In such radius curvature measuring, due to the spherical surface measuring using a conventional spherometer 101, both the spherometer 101 and the reference lens 107 or the lens to be measured 108 are measured by holding the lenses and spherometer by hands, so that the whole periphery of the spherometer ring 104 of the spherometer 101 may be made in contact with the spherical surfaces of the reference lens 107 and the lens to be measured 108 while adjusting its inclination by hands.

When spherical surface measuring is performed easily and precisely, the spherometer 101, the reference lens 107 and lens to be measured 108 are arranged on a vertically movable device, however, in such an arrangement, the whole periphery of the spherometer ring 104 can not be suitably placed in contact with the spherical surfaces of the reference lens 107 and the lens to be measured 108, so that very small axial shift and an inclination are produced on the axis of the measuring member 106 of the spherometer and precise measuring can not be performed.

SUMMARY OF THE INVENTION

It is an object of the present invention to eliminate the above disadvantages of the conventional spherometer.

It is another object of the present invention to provide a spherometer in which even if the axial shift and the inclination are produced on the axis of the measuring member of the spherometer and the optical axis of the lens, the measuring of the spherical surface may be performed precisely and easily.

According to the present invention, there is provided a spherometer comprising a spherometer ring having an annular portion or a part of an annular portion, a measuring member coaxially secured to the spherometer ring, a supporting member for supporting the spherometer ring, and a tilt facilitating member interposed between the spherometer ring and the ring supporting member.

DETAILED EXPLANATION OF THE PREFERRED EMBODIMENTS

Figure 1:
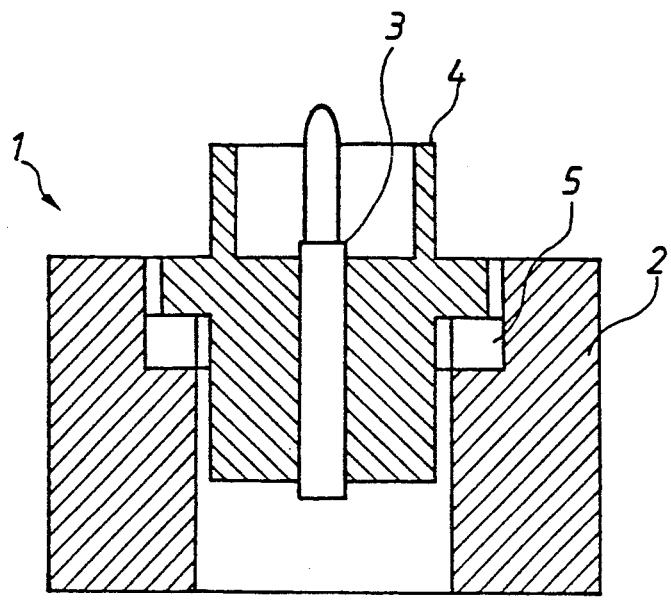
FIG. 1 is a vertical sectional view, conceptually showing a spherometer according to the present invention.

Now to the drawings, in FIG. 1 there is conceptually shown a a spherical surface measuring section of a spherometer according to the present invention.

Reference numeral 1 is a spherometer with its display section not shown. The spherometer 1 comprises a ring supporting member 2, a measuring member (rod) 3 coaxially fitted in a spherometer ring 4 having an annular portion or a part an annular portion, and a tilt facilitating member 5 interposed between the annular portion of the spherometer ring 4 and the ring supporting member 2. The spherometer ring 4 is also fitted in the ring supporting member 2 coaxially.

According to the spherometer of the present invention, even if the axial shift or inclination are present between the axis of the measuring shaft of the spherometer ring and optical axis of the reference lens or the lens to be measured, the tilt facilitating member interposed between the ring suitably supporting member and the spherometer ring brings the whole periphery of the annular portion of the spherometer ring into contact with the spherical surface of the reference lens and the lens to be measured.

FIRST EMBODIMENT

Figure 2:
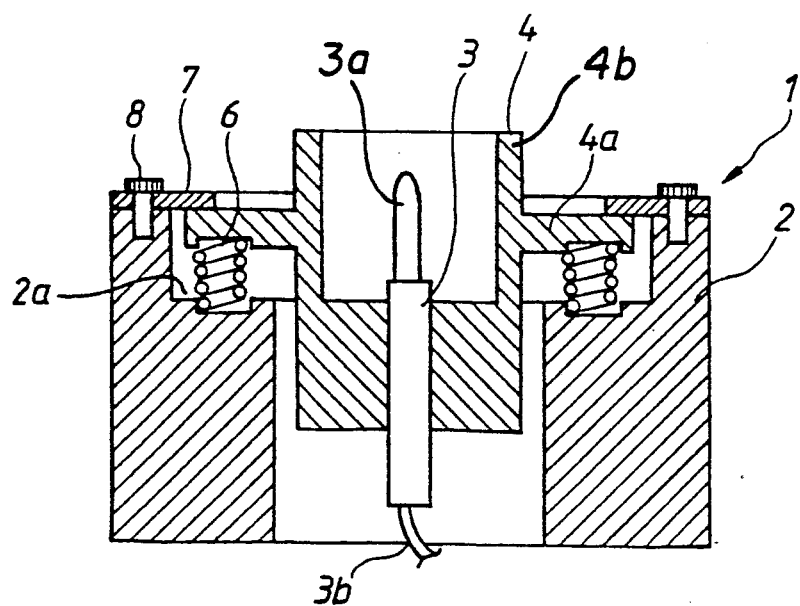
FIG. 2 is a vertical sectional view showing first embodiment of spherometer according to the present invention.

FIG. 2 is a vertical sectional view showing a first embodiment of the spherometer according to the present invention.

As shown in FIG. 2, reference numeral 1 is a spherometer (its display section is not shown) which is constructed as follows.

A cylindrical ring supporting member 2 has an annular step 2a at its upper portion, and three springs 6 (one of these spring 6 is not shown) are secured on the annular step 2a concyclically at equal intervals. The upper end of the spring 6 is engaged to the under surface of a flange portion 4a of a spherometer ring 4 which is loosely fitted in the ring supporting member 2. The upper end of the ring supporting member 2 is secured to a fixing ring 7 by a screw 8. The fixing ring 7 is engaged to the upper surface of the flange 4a and serves to limit moving range of the spherometer ring 4 in the upward direction.

The spherometer ring 4 has at its upper portion an annular portion 4b which contacts the spherical surface of the lens during measuring.

A measuring member 3 is extended through the center potion of the spherometer ring 4 and fitted in the spherometer ring 4 coaxially.

A measuring rod 3a is slidably fitted in the upper portion of the measuring member 3 and a wire 3b is connected to the lower portion of the measuring member 3, thereby displaying a displacement amount $\Delta h$ in the axial direction of the measuring rod 3a at a meter (not shown).

According to the present embodiment, the spherometer ring 4 of the spherometer 1 is held by a spring 6 and thus the spherometer ring 4 is tiltable in all directions, so that even if the optical axis of the lens to be measured (not shown) and the axis of the measuring member 3 are shifted and tilted, the axial shift and the inclination of the measuring member 3 can be corrected by the inclination of the spherometer ring 4. This correction brings the whole periphery of the annular portion 4b of the spherometer ring 4 into contact with the measuring surface of the lens, thereby easily and precisely performing spherical surface measuring of the lens.

In this embodiment, the spherometer ring 4 is held by three springs 6, but more than four springs 6 may be provided concyclically and at equal intervals.

SECOND EMBODIMENT

Figure 3:
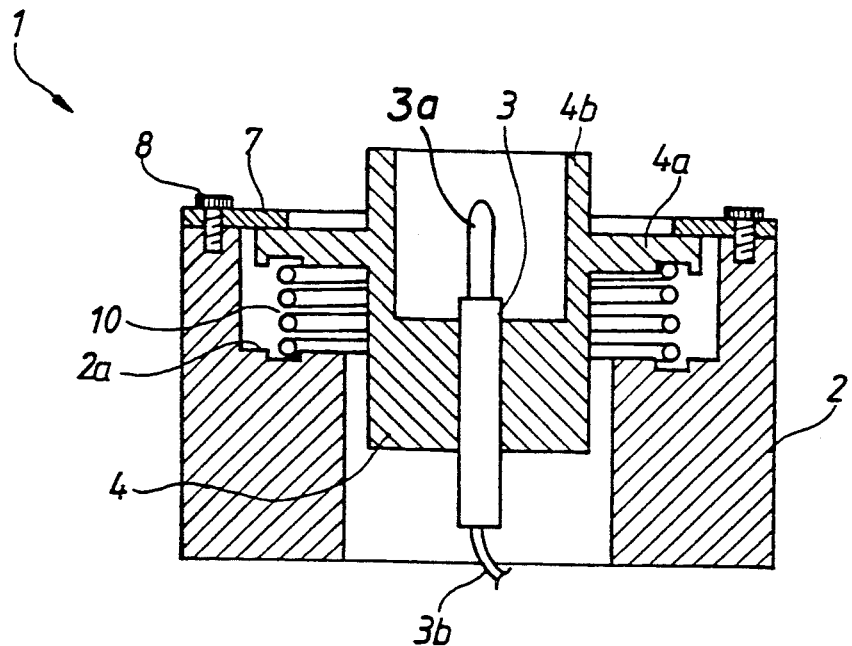
FIG. 3 is a vertical sectional view showing second embodiment of spherometer according to the present invention.

A second embodiment of the spherometer according to the present invention is shown in FIG. 3, in which parts similar to those previously described with reference to FIG. 2 are denoted by the same reference numerals.

In this embodiment, a spherometer 1 (its display section is not shown) comprises a spring 10 having a large inner diameter, instead of three springs 6 which hold the spherometer ring 4 as in the first embodiment. That is, only one of the large spring 10 holds the spherometer ring. The construction other than the above construction is the same as those of the previous construction so that its detailed explanation is omitted.

According to the above embodiment, a spring 10 having large inner diameter is secured to a step 2a provided to the upper portion of the ring supporting member 2 and the spherometer ring 4 is held by this spring 10.

In this embodiment, also, the spherometer 4 is tiltable in all directions, so that the same advantageous effect as in the first embodiment can be obtained.

THIRD EMBODIMENT

Figure 4:
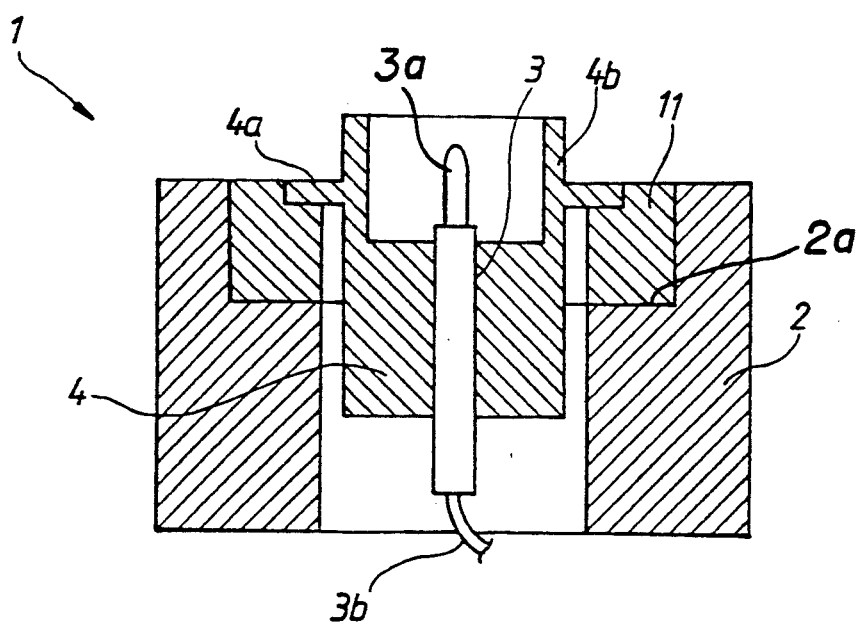
FIG. 4 is a vertical view showing third embodiment of spherometer according to the present invention.

A third embodiment of the spherometer according to the present invention is shown in FIG. 4, in which parts similar to those previously described with reference to FIG. 1 are denoted by the same reference numerals.

In this embodiment, a spherometer 1 (its display section is not shown) comprises a super elastic member instead of three springs for holding the spherometer ring shown in first embodiment. The construction other than the above construction is the same as that shown in first embodiment, so that its explanation is omitted.

In this embodiment, at least three super elastic members 11 (for example, such as a rubber with low hardness) are concyclically secured on a step 2a provided at the upper portion of a ring supporting member 2 at equal intervals, thereby holding a spherometer ring 4 with the super elastic member 11.

Even in this embodiment, the utilization of the super elastic member 11 makes the spherometer ring 4 tiltable in all directions, thereby obtaining the same advantageous effect as in the first embodiment.

In this embodiment, the spherometer ring 4 is held by at least three super elastic members, but a ring shaped super elastic member may be also secured to the step 2a.

FOURTH EMBODIMENT

Figure 5:
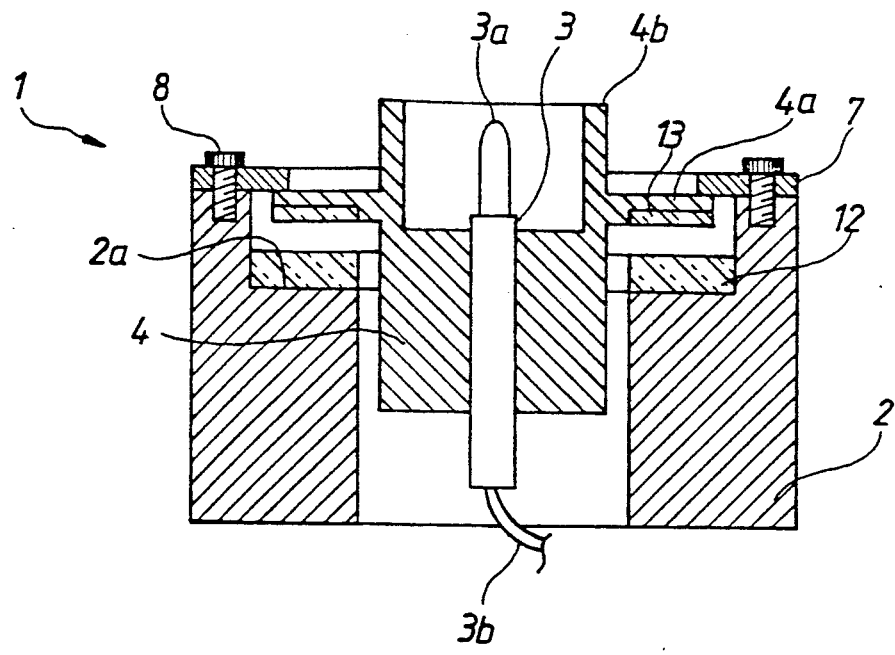
FIG. 5 is a vertical sectional view showing fourth embodiment of spherometer according to the present invention.

A fourth embodiment of the spherometer according to the present invention is shown in FIG. 5, in which parts similar to those previously described with reference to FIG. 2 are denoted by the same reference numerals.

In this embodiment, the spherometer 1 (its display section is not shown) comprises a permanent magnet 12, instead of three springs 6 for holding the spherometer ring shown in the first embodiment, thereby holding the spherometer ring by a repelling force of the permanent magnet 12. The construction other than the above construction is the same as that shown in the second embodiment, so that its detailed explanation is omitted.

In this embodiment, at least three permanent magnets 12 are concyclically secured on a step 2a provided at the upper portion of a ring supporting member 2 at equal intervals, and corresponding permanent magnets 13 are provided under the flange portion 4a of the spherometer ring 4 and arranged opposite to the permanent magnets 12 provided on a 9 step 2a of the ring supporting member 2. The number of the permanent magnets 13 is made coincident with the number of the permanet magnets 12. These permanent magnets 12 and 13 are so constructed such that the same poles of the respective magnetic poles are opposed and facing each other, thereby causing repelling force between the magnets 12 and 13.

The spherometer ring 4 is held under the floating state by the repelling force, so that the spherometer ring 4 becomes tiltable in all directions, thereby obtaining the same advantageous effect as in the first embodiment.

In this embodiment, at least three permanent magnets 12 and 13 are constructed such that the same pole of the respective magnetic poles are facing opposite to each other, thereby holding the spherometer ring 4. The permanent magnets 12 and 13 may also be ring shaped, and secured to the step 2a and the flange portion 4a, respectively in a manner that same poles of the magnetic poles are facing opposite to each other.

FIFTH EMBODIMENT

Figure 6:
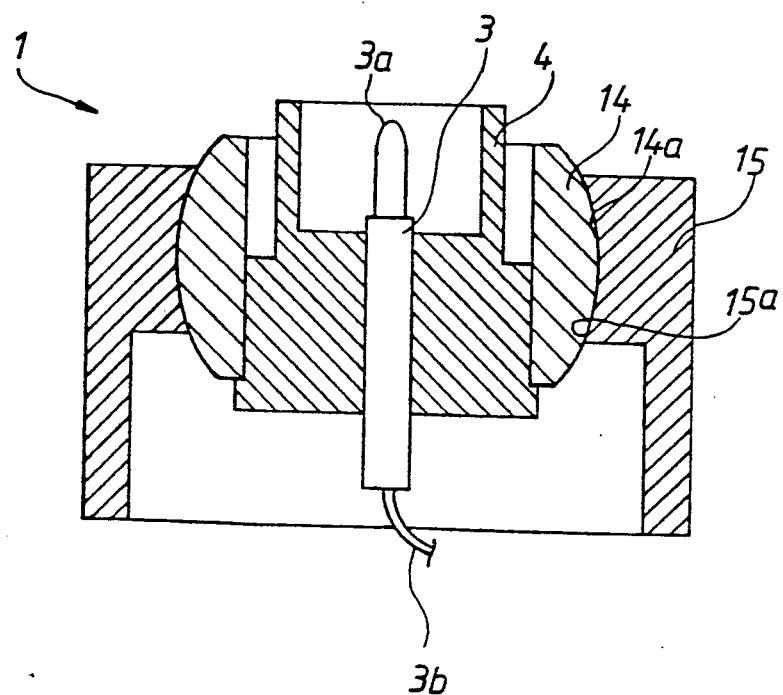
FIG. 6 is a vertical sectional view showing fifth embodiment of spherometer according to the present invention.

A fifth embodiment of the spherometer according to the present invention is shown in FIG. 6, in which parts similar to those previously described with reference to FIG. 4 are denoted by the same reference numerals.

In this embodiment, a spherometer 1 comprises a spherometer ring 4 which is not provided with a flange portion 4a (shown in FIG. 1) as in the first embodiment, and a ring 14 having a sectional shape of a plano-convex and positioned between the spherometer ring 4 and a ring supporting member 15. The construction other than the above construction is the same as that shown in the third embodiment, so that its detailed explanation is omitted.

That is, the ring 14 has an outer convex surface 14a and an inner plano surface.

The ring supporting member 15 has an outer plano surface and an inner concave surface 15a at its upper portion. The inner concave surface 15a of the supporting member 15 and the outer convex surface 14a of the ring 14 are in a male and female relationship, so that when these surfaces 14a and 15a are made in contact with each other, the spherometer ring 4 may be mounted to the ring supporting member 15 with tiltable about the axis of a measuring member 3.

According to this embodiment, in addition to the same advantageous effect as in the first embodiment, the construction becomes simple and the cost may be decreased.

SIXTH EMBODIMENT

Figure 7:
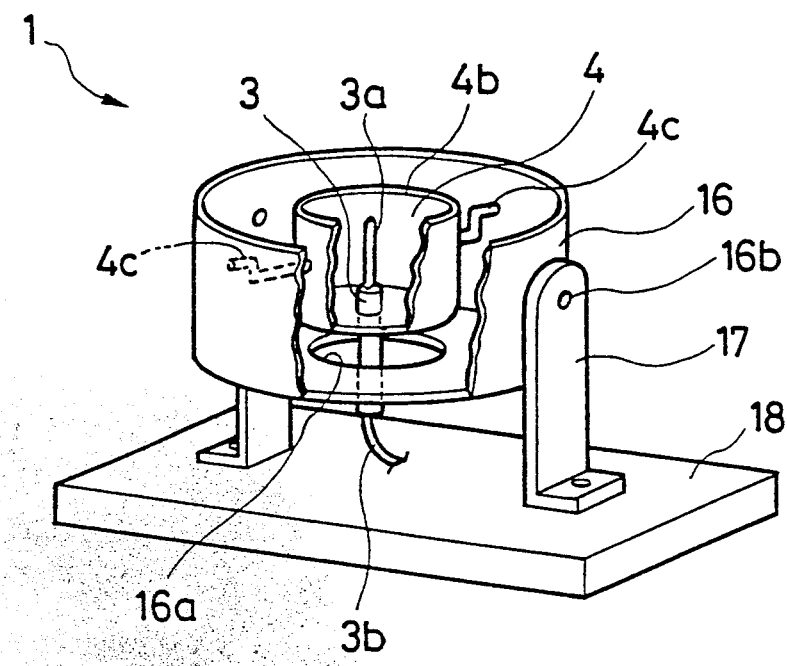
FIG. 7 is a perspective view showing sixth embodiment of spherometer according to the present invention.
Figure 8:
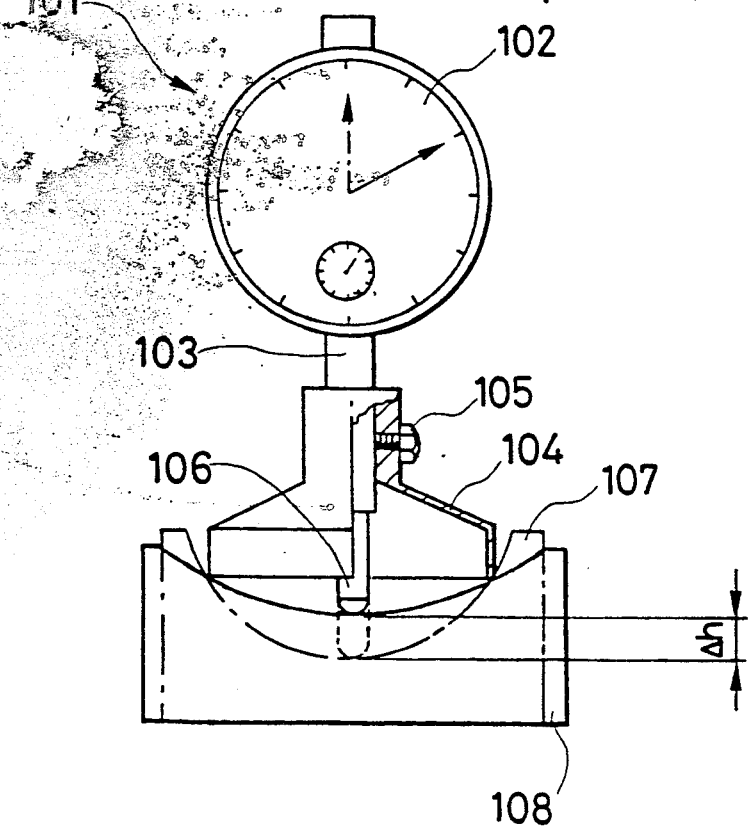
FIG. 8 is a front view showing a construction of a conventional spherometer.

A sixth embodiment of the spherometer according to the present invention is shown in FIG. 7, in which parts similar to those previously described with reference to FIG. 1 to 6 are denoted by the same reference numerals.

In this embodiment, a spherometer 1 comprises a spherometer ring 4 which is not provided with a flange portion 4a (shown in FIG. 1) as in the first embodiment and a tiltable ring 16. The construction other than the above construction is the same as that shown in the previous embodiments, so that its detailed explanation is omitted.

In this embodiment, the spherometer ring 4 is tiltably supported to the ring 16 by a pair of crank pins 4c. One end of the crank pin 4c is secured to an upper side surface of the spherometer ring 4 and the other end thereof is rotatably secured to the upper inner surface of the tiltable ring 16 at the position of the same level as the upper end of an annular member 4b of the spherometer ring 4.

The bottom of the tiltable ring 16 is provided with an opening 16a having a diameter in such a manner that even if the spherometer ring 4 is tilted, the measuring member 3 projecting from the spherometer ring 4 and extending through the tiltable ring 16 is not in contact with the opening 16a. The tiltable ring 16 is supported by a pair of ring supporting members 17 with the use of pins 16b provided at right angles to the crank pins 4c in such a manner that the ring 16 may be tilted at right angles to the tilting direction. This pin 16b is positioned at the same level as the upper end of the annual portion 4b of the spherometer ring 4.

The ring supporting member 17 is studded on a base plate 18.

Since the pins 16b and 4c are arranged at right angles, the spherometer ring 4 is supported by a link mechanism, so that the spherometer ring may be tiltably supported in all directions. Also, since the pins 4c and 16b are provided at the same level as the upper edge of the annular edge 4b of the spherometer ring 4, the tilting movement in case of contacting the spherometer ring 4 with the spherical surface of a lens to be measured becomes very suitable, so that the shift and inclination between the optical axis of the lens to be measured and the axis of the spherometer ring 4 may be corrected smoothly and thus the measuring of the spherical surface may be performed precisely and easily.

In the above described first to sixth embodiments, the annular portion 4b of the spherometer ring 4 is made continuous so as to contact with the spherical surface of the lens. However, the present invention is not limited to the continuous annular ring, for example a ring having a partially notched portion may also be utilized.

What is claimed is:

1. A spherometer comprising:
    a spherometer ring having at least a partial annular portion;
    a measuring member interconnected to the spherometer ring;
    a ring supporting member for supporting the spherometer ring; and
    at least one tilt facilitating member interposed between the spherometer ring and the ring supporting member such that the spherometer ring is movably mounted with respect to said ring supporting member for allowing tilting movement of the spherometer ring with respect to the ring supporting member during a measuring operation.

2. A spherometer as claimed in claim 1, wherein the tilt facilitating member is a spring.

3. A spherometer as claimed in claim 1, wherein the tilt facilitating member is a super elastic member.

4. A spherometer as claimed in claim 1, wherein the tilt facilitating member is a pair of magnets.

5. A spherometer as claimed in claim 1, wherein the tilt facilitating member is a ring having a plano-convex section, and the ring supporting member includes an outer plano surface and an inner concave surface.

6. A spherometer as claimed in claim 1, wherein the tilt facilitating member is a link mechanism.

7. The spherometer of claim 6, wherein the link mechanism includes a pair of crank pins upon which spherometer ring is supported for tilting with respect to a tiltable ring and wherein the tiltable ring is pivotably mounted upon the ring supporting member such that tilting movement about a first axis is provided by the mounting of the spherometer ring upon the crank pins and tilting movement about a second axis is provided by the tiltable ring pivotably mounted upon the ring supporting member.

8. The spherometer of claim 1, further including a plurality of tilt facilitating members.

9. The spherometer of claim 1, wherein the spherometer ring includes an annular ring.

* * * * *